US008675079B2

(12) United States Patent
Ishii et al.

(10) Patent No.: US 8,675,079 B2
(45) Date of Patent: Mar. 18, 2014

(54) IMAGE CAPTURE DEVICE, IMAGE PROCESSING DEVICE AND IMAGE PROCESSING PROGRAM

(75) Inventors: Yasunori Ishii, Osaka (JP); Yusuke Monobe, Kyoto (JP)

(73) Assignee: Panasonic Corporation, Osaka (JP)

(*) Notice: Subject to any disclaimer, the term of this patent is extended or adjusted under 35 U.S.C. 154(b) by 213 days.

(21) Appl. No.: 13/320,100

(22) PCT Filed: Jan. 27, 2011

(86) PCT No.: PCT/JP2011/000443
§ 371 (c)(1),
(2), (4) Date: Nov. 11, 2011

(87) PCT Pub. No.: WO2011/114611
PCT Pub. Date: Sep. 22, 2011

(65) Prior Publication Data
US 2012/0057036 A1     Mar. 8, 2012

(30) Foreign Application Priority Data

Mar. 19, 2010     (JP) .................................. 2010-064996

(51) Int. Cl.
*H04N 5/228*     (2006.01)
(52) U.S. Cl.
USPC .................................................... 348/208.1
(58) Field of Classification Search
USPC ................. 348/222.1, 208.1–208.7
See application file for complete search history.

(56) References Cited

U.S. PATENT DOCUMENTS

| 2006/0093233 A1 | 5/2006 | Kano et al. |
| 2007/0258706 A1 | 11/2007 | Raskar et al. |
| 2011/0141298 A1 | 6/2011 | Nishiyama |
| 2012/0327192 A1* | 12/2012 | Pfeiffer et al. .................. 348/46 |

FOREIGN PATENT DOCUMENTS

| JP | 2001-197357 A | 7/2001 |
| JP | 2006-050343 A | 2/2006 |
| JP | 2006-129236 A | 5/2006 |
| JP | 2008-310797 A | 12/2008 |
| JP | 2009-522825 T | 6/2009 |
| JP | 2010-050745 A | 3/2010 |

OTHER PUBLICATIONS

International Search Report for corresponding International Application No. PCT/JP2011/000443 mailed Apr. 12, 2011.

(Continued)

*Primary Examiner* — Yogesh Aggarwal
(74) *Attorney, Agent, or Firm* — Renner, Otto, Boisselle & Sklar, LLP

(57) ABSTRACT

An image capture device of the present invention includes: a plurality of image sensors (310a, 310b); an optical element (light entrance section) 315 which is configured to allow incoming light to sequentially impinge on the respective image sensors (310a, 310b) according to a time-coded pattern during the exposure time; a camera shake detection section 345 for detecting camera shake which occurs during the exposure time to generate camera shake information that represents a trajectory of the camera shake; and an image processing section 220 for processing the plurality of images obtained by the plurality of image sensors (310a, 310b). The image processing section 220 includes a PSF determination section for determining, based on the camera shake information and the time-coded pattern, point spread functions that define blurs which are caused by the camera shake in the respective images, an image restoration section for restoring respective images using the point spread functions, and an image synthesizing section for synthesizing the plurality of restored images.

9 Claims, 8 Drawing Sheets

(56) References Cited

OTHER PUBLICATIONS

Ramesh Raskar, "Technologies Leading to the Next-generation Digital Cameras and Movies (The Last Chapter)", The Journal of the Institute of Image Information and Television Engineers, Dec. 1, 2008, vol. 62, No. 12, pp. 1952-1958.

Ramesh Raskar, "Computational Photography: Epsilon to Coded Photography", 2008, pp. 1-15 (English version of Ramesh Raskar, "Technologies Leading to the Next-generation Digital Cameras and Movies".

Shan et al., "High-quality Motion Deblurring from a Single Image", SIGGRAPH 2008, ACM Transactions on Graphics, vol. 27, No. 3, Article 73, Publication date: Aug. 2008.

Yoneji et al., "PSF Parameter Estimation for Restoration of Linear Motion Blurred Image", IPSJ SIG Technical Report, vol. 2005-CVIM-149, No. 38, pp. 47-52, 2005.

Bioucas-Dias et al., "Bayesian Wavelet-Based Image Deconvolution: A GEM Algorithm Exploiting a Class of Heavy-Tailed Priors", IEEE Transactions on Image Processing, vol. 15, No. 4, pp. 937-951, Apr. 2006.

Anat Levin, "Blind Motion Deblurring Using Image Statistics", Advances in Neural Information Processing Systems (NIPS), Dec. 2006.

Fergus et al., "Removing Camera Shake from a Single Photograph", SIGGRAPH, 2006.

Raskar et al., "Coded Exposure Photography: Motion Deblurring Using Fluttered Shutter", SIGGRAPH 2006.

Agrawal et al., "Coded Exposure Deblurring: Optimized Codes for PSF Estimation and Invertibility", Mitsubishi Electric Research Labs (MERL), IEEE Computer Society Conference on Computer Vision and Pattern Recognition (CVPR), Poster Session 5, Jun. 2009; http://www.merl.com.

\* cited by examiner

FIG.3
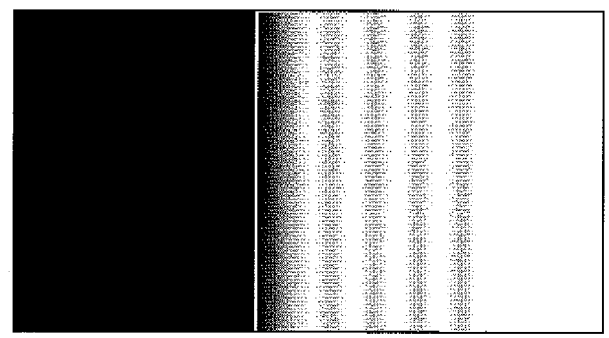
(a)
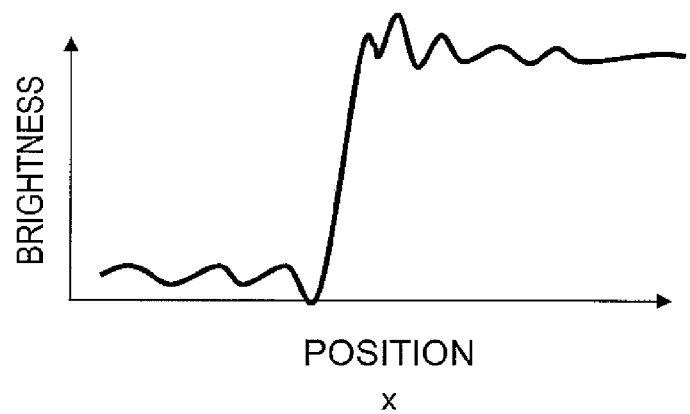
(b)
FIG.4
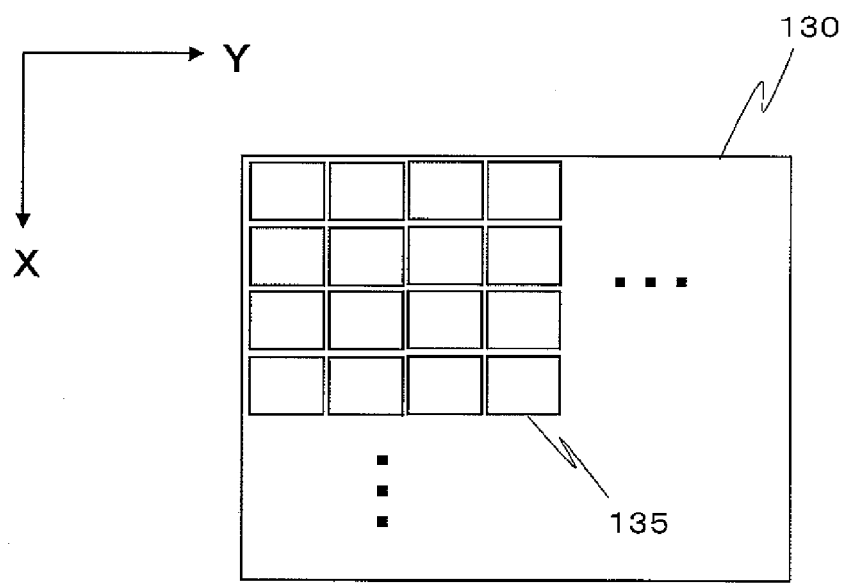

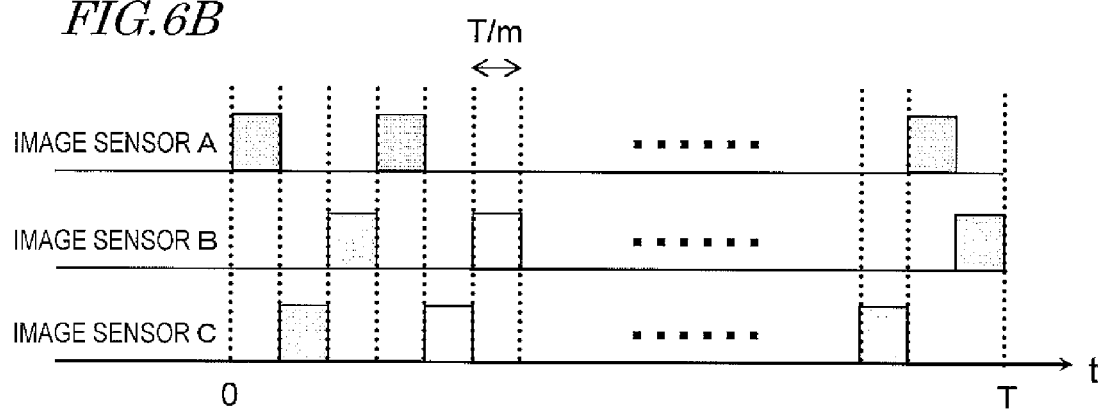
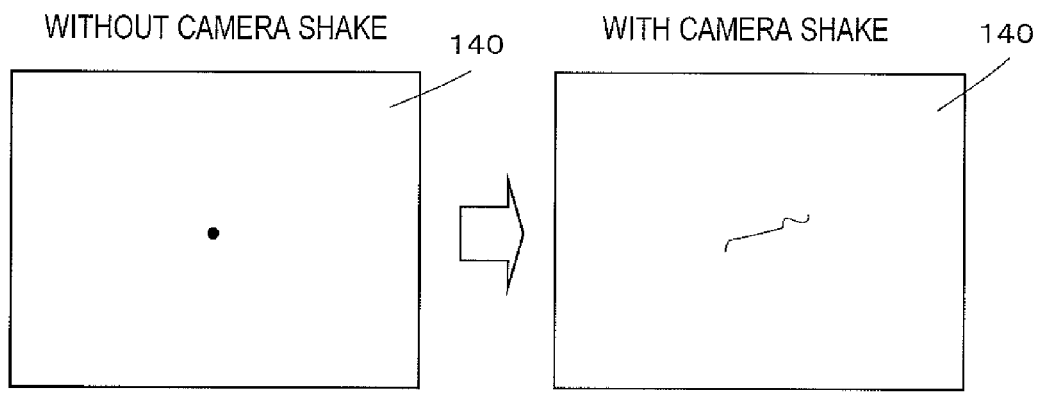

IMAGE CAPTURE DEVICE, IMAGE PROCESSING DEVICE AND IMAGE PROCESSING PROGRAM

TECHNICAL FIELD

The present invention relates to an image capture device, an image processing device, and an image processing program which are for use in image restoration.

BACKGROUND ART

In the case of capturing an image by a digital camera, noise may sometimes be added to the image due to the characteristics of a CCD (Charge-Coupled Device) or a readout circuit for CMOS or the characteristics of transmission paths. Also, blur of an image due to an out-of-focus condition in capturing of the image or blur of an image due to camera shake occurs. In this way, the captured image has blur which is attributed to user's handling of the camera in photographing in addition to the noise which is attributed to the specific characteristics of the captured image, so that the image is degraded. Among such "blur" types, blur of an image which is attributed to a motion of a camera (camera shake) during photographing (exposure) is herein referred to as "motion blur", so that it is distinguishable from blur that is attributed to an out-of-focus condition (out-of-focus blur).

In recent years, especially, demand for high sensitive photography is increasing, and therefore, it is necessary to restore an image degraded by blur (hereinafter, "degraded image") to an image which is as close to an original image (hereinafter, "ideal image") as possible. To realize a bright image which is free from noise or blur, such as an image demanded in high sensitive photography, the solutions are generally divided into two ideas, increasing the sensitivity and extending the exposure time.

However, increasing the sensitivity disadvantageously leads to amplification of noise. As a result, a signal is buried in the noise so that, in many cases, large part of a resultant image is formed by the noise. On the other hand, extending the exposure time enables accumulation of a larger amount of light which occurs at that site, resulting in an image which includes smaller noise. In this case, a signal would not be buried in the noise, but there is a problem of generation of motion blur in an image due to camera shake during the exposure time.

According to the prior art, there are two countermeasures against the problem resulting from the extended exposure time. One is optical camera shake compensation, such as lens shift, sensor shift, or the like. The optical camera shake compensation is disclosed in, for example, Patent Document 1. The other one is obtaining the direction/magnitude of motion blur from a resultant image and performing signal processing based on the obtained direction/magnitude of the blur to restore the image (a restoration method based on signal processing). The restoration method based on signal processing is, for example, disclosed in Patent Documents 2 to 4 and Non-patent Documents 1 to 7.

Extending the exposure time for the purpose of collecting a sufficient amount of light in a dark environment increases the probability of occurrence of camera shake. To avoid motion blur by means of optical camera shake compensation in such a dark environment, it is necessary to extend the operation range of a lens or a sensor. However, there is a problem that, when the operation range is increased, a time delay occurs in moving the lens or the sensor. Also, increasing the operation range encounters a physical limit.

A phenomenon that an image is degraded due to camera shake, from an ideal image to a degraded image, can be modeled as described below. A function which represents the brightness of each pixel of the degraded image is thought to be obtained by convolution of a function that represents the brightness of each pixel in the ideal image and a point spread function (PSF) that represents blur of an image. Restoration of the ideal image based on the obtained degraded image is realized by deconvolution of the degraded image and the PSF. A convolution operation is equivalent to a multiplication in the frequency space. Therefore, in the frequency space, the degraded image is divided by the PSF, whereby the restored image can be obtained.

Thus, when the PSF is known, the restored image can be obtained relatively readily by means of the above-described deconvolution so long as the effect of noise is neglected. On the other hand, when the PSF is unknown, it is necessary to estimate the PSF from the degraded image in order to obtain a restored image.

Estimation of the PSF may be realized by, for example, a method based on the sparse coding concept which is disclosed in Non-patent Document 1. According to this method, in the first place, a first restoration result is obtained from a manually-given initial PSF and a degraded image. Then, the first restoration result and the degraded image are used to estimate a PSF which is close to a true PSF. The initial PSF is amended with the estimated PSF. The amended PSF is used to obtain the second restoration result based on the degraded image. Subsequently, the step of obtaining the $N^{th}$ restored image from the $(N-1)^{th}$ PSF and the degraded image and the step of estimating the $N^{th}$ PSF from the $N^{th}$ restored image and the degraded image are repeated, whereby a PSF estimation process and a restoration process performed on the degraded image are concurrently advanced.

However, this method has a problem that the restored image includes noise, such as ringing artifacts. "Ringing" refers to noise which makes a uniform brightness portion of an image (flat portion) appear uneven.

FIG. 1($a$) is a plan view showing an image in which the brightness changes stepwise (an ideal image near an edge). FIG. 1($b$) is a graph schematically showing the brightness distribution of the image. FIG. 2($a$) is a plan view showing a degraded image (blurred image) obtained by photographing the image of FIG. 1($a$) using a camera. FIG. 2($b$) is a graph schematically showing the brightness distribution of the image. This is herein assumed to be a result of a horizontal sideward camera shake in photographing with a camera. The degraded image of FIG. 2($a$) lacks sharpness at the edge due to camera shake blur (motion blur). FIG. 3($a$) is a plan view showing an image restored by signal processing based on the degraded image of FIG. 2($a$). FIG. 3($b$) is a graph schematically showing the brightness distribution of the restored image. The restored image of FIG. 3($a$) includes a portion in which the brightness periodically varies. Such a variation in brightness is noise called "ringing". Ringing occurs due to the presence of a point in the frequency space at which the value of the PSF is zero (0).

The techniques of solving such a ringing problem are disclosed in Patent Documents 3 and 4 and Non-patent Documents 6 and 7. According to these techniques, light is blocked according to a predetermined time pattern (coded pattern) rather than keeping the shutter open during the exposure time, whereby a portion of the frequency space in which the PSF is zero (0) can be reduced. Therefore, occurrence of ringing noise can be prevented. The methods disclosed in Patent Documents 3 and 4 and Non-patent Documents 6 and 7 are called "Coded Exposure Photography".

CITATION LIST

Patent Literature

Patent Document 1: Japanese Laid-Open Patent Publication No. 2001-197357
Patent Document 2: Japanese Laid-Open Patent Publication No. 2006-129236
Patent Document 3: Japanese PCT National Phase Laid-Open Publication No. 2009-522825
Patent Document 4: Japanese Laid-Open Patent Publication No. 2008-310797

Non-Patent Literature

Non-patent Document 1: "High-quality Motion Deblurring from a Single Image", Qi Shan, Jiaya Jia, and Aseem Agarwala, SIGGRAPH 2008
Non-patent Document 2: Yoneji, Tanaka, and Okutomi, "PSF Parameter Estimation for Restoration of Linear Motion Blurred Image", IPSJ SIG Technical Report, Vol. 2005, No. 38, pp. 47-52, 2005
Non-patent Document 3: J. Bioucas-Dias, "Bayesian wavelet-based image deconvolution: a gem algorithm exploiting a class of heavy-tailed priors", IEEE Trans. Image Proc., vol. 4, pp. 937-951, April 2006
Non-patent Document 4: Levin, "Blind Motion Deblurring Using Image Statistics", Advances in Neural Information Processing Systems (NIPS), December 2006
Non-patent Document 5: Bob Fergus et al., "Removing camera shake from a single image", Barun Singh Aaron Hertzmann, SIGGRAPH 2006
Non-patent Document 6: "Coded Exposure Photography: Motion Deblurring using Fluttered Shutter", Ramesh Raskar, Amit Agrawal, Fack Tumblin, SIGGRAPH 2006
Non-patent Document 7: "Coded Exposure Deblurring: Optimized Codes for PSE Estimation and Invertibility", Amit Agrawal, Yi Xu, MITSUBISHI ELECTRIC RESEARCH LABORATORIES, http://www.merl.com

SUMMARY OF INVENTION

Technical Problem

The methods disclosed in Patent Documents 3 and 4 and Non-patent Documents 6 and 7 enable reduction of ringing and are therefore effective in image restoration. However, since the shutter is opened and closed according to the coded pattern during the exposure time, the amount of incoming light decreases and the light utilization efficiency also decreases as compared with a case where the shutter is kept open. Therefore, particularly in a dark photographing environment, it is necessary to extend the exposure time (the period from the start to the end of the exposure) as compared with a case where the shutter is kept open. However, if the exposure time is extended, the amount of camera shake which occurs during the exposure time increases, so that accurate restoration is difficult. Thus, even when the shutter is opened and closed, it is preferred that the exposure time is generally equal to that selected in the case where the shutter is kept open.

The present invention was conceived in view of the above problems. One of the objects of the present invention is to provide an image capture device, an image processing device, and an image processing program which enable reduced ringing noise and improved light utilization efficiency in Coded Exposure Photography.

Solution to Problem

An image capture device of the present invention includes: a plurality of image sensors, each of which obtains an image according to light received by the image sensor during an exposure time; a light entrance section which is configured to allow incoming light to sequentially impinge on at least two of the plurality of image sensors according to a time-coded pattern during the exposure time; a camera shake detection section for detecting camera shake which occurs during the exposure time to generate camera shake information that represents a trajectory of the camera shake; and an image processing section for processing the plurality of images obtained by the plurality of image sensors. The image processing section includes a PSF determination section for determining, based on the camera shake information and the time-coded pattern, a plurality of point spread functions that define blurs which are caused by the camera shake in the plurality of images obtained by the plurality of image sensors during the exposure time, an image restoration section for generating restored images in which the blurs caused by the camera shake are reduced from respective ones of the plurality of images based on the point spread functions, and an image synthesizing section for generating a synthesized image from the plurality of restored images generated by the image restoration section.

The light entrance section may include a mirror section which is capable of switching an inclination of its reflection surface such that the reflection surface reflects the incoming light so as to sequentially impinge on at least two of the plurality of image sensors, and a mirror driving section for driving the reflection surface of the mirror section according to the time-coded pattern during the exposure time.

The mirror section may include a plurality of micromirrors which are arrayed in a two-dimensional arrangement, and the mirror driving section may drive reflection surfaces of the plurality of micromirrors according to the time-coded pattern.

The light entrance section may allow the incoming light to alternately impinge on two image sensors according to the time-coded pattern.

The image synthesizing section may superimpose the plurality of restored images together to generate the synthesized image.

Another image capture device of the present invention includes: a plurality of image sensors, each of which obtains an image according to light received by the image sensor during an exposure time; a light entrance section which is configured to allow incoming light to sequentially impinge on at least two of the plurality of image sensors according to a time-coded pattern during the exposure time; and an image processing section for processing the plurality of images obtained by the plurality of image sensors. The image processing section includes a PSF determination section for determining, based on the time-coded pattern, a plurality of point spread functions that define blurs which are caused by camera shake in the plurality of images obtained by the plurality of image sensors during the exposure time, an image restoration section for generating restored images in which the blurs caused by the camera shake are reduced from respective ones of the plurality of images based on the point spread functions, and an image synthesizing section for generating a synthesized image from the plurality of restored images generated by the image restoration section.

Still another image capture device includes: a plurality of image sensors, each of which obtains an image according to light received by the image sensor during an exposure time; a light entrance section which is configured to allow incoming light to sequentially impinge on at least two of the plurality of image sensors according to a time-coded pattern during the exposure time; and a camera shake detection section for detecting camera shake which occurs during the exposure time to generate camera shake information that represents a trajectory of the camera shake; and a recording section for recording information that defines the time-coded pattern, the plurality of images obtained by the plurality of image sensors during the exposure time, and the camera shake information in a storage medium.

In one embodiment, the image capture device further includes a PSF determination section for determining, based on the camera shake information and the time-coded pattern, a plurality of point spread functions that define blurs which are caused by camera shake in the plurality of images obtained by the plurality of image sensors during the exposure time, wherein the recording section records the plurality of point spread functions in the storage medium.

An image processing device of the present invention includes: an input section for retrieving the information that defines the time-coded pattern, the plurality of images, and the camera shake information recorded by the image capture device of the present invention; a PSF determination section for determining, based on the information that defines the time-coded pattern and the camera shake information, a plurality of point spread functions that define blurs which are caused by camera shake in the plurality of images; an image restoration section for generating restored images in which the blurs caused by the camera shake are reduced from respective ones of the plurality of images based on the point spread functions, and an image synthesizing section for generating a synthesized image from the plurality of restored images generated by the image restoration section.

A program of the present invention is a program for processing a plurality of images which are obtained by an image capture device during an exposure time, the image capture device including a plurality of image sensors, each of which obtains an image according to light received by the image sensor during the exposure time; a light entrance section which is configured to allow incoming light to sequentially impinge on at least two of the plurality of image sensors according to a time-coded pattern during the exposure time; and a camera shake detection section for detecting camera shake which occurs during the exposure time to generate camera shake information that represents a trajectory of the camera shake, the program comprising the steps of: obtaining information that defines the time-coded pattern, the plurality of images, and the camera shake information; determining, based on the information that represents the time-coded pattern and the camera shake information, a plurality of point spread functions that define blurs which are caused by camera shake in the plurality of images obtained by the plurality of image sensors during the exposure time; generating restored images in which the blurs caused by the camera shake are reduced from respective ones of the plurality of images based on the point spread functions; and generating a synthesized image from the plurality of restored images generated by the image restoration section.

Advantageous Effects of Invention

According to the present invention, in a system for performing a restoration process on a degraded image, occurrence of ringing noise is prevented, and the light utilization efficiency is improved.

BRIEF DESCRIPTION OF DRAWINGS

FIG. 3(a) is a plan view showing an image restored by signal processing based on the degraded image of FIG. 2(a). FIG. 3(b) is a graph schematically showing the brightness distribution of the restored image.

FIG. 4 is a diagram showing a pixel arrangement in an image.

FIG. 6B shows an example of a time-coded pattern in the case where three image sensors can receive light.

FIG. 7 shows an example of the trajectory of camera shake which occurs during an exposure time.

DESCRIPTION OF EMBODIMENTS

Figure 1:
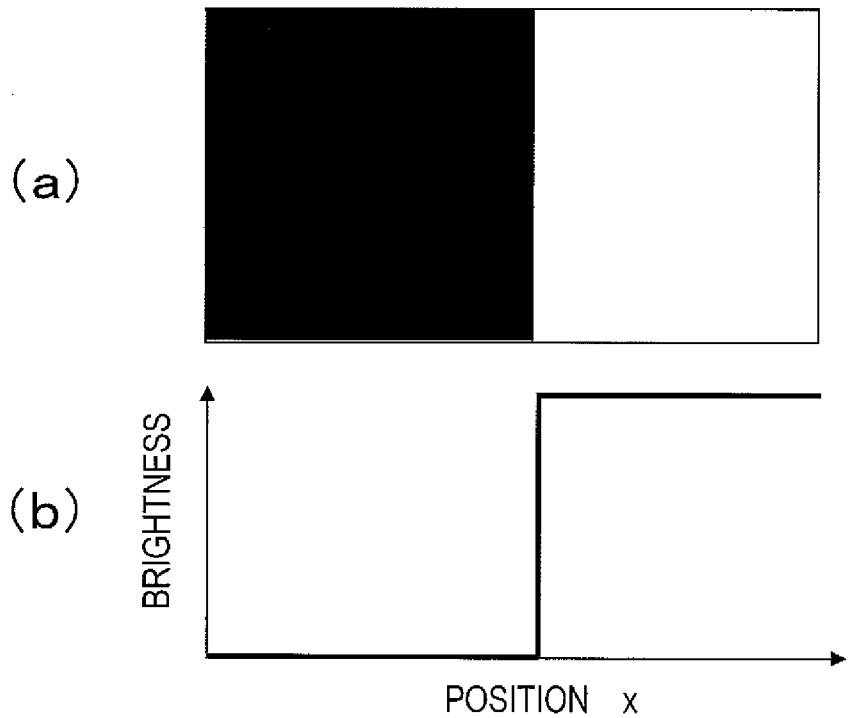
FIG. 1(a) is a plan view showing an image in which the brightness changes stepwise (an ideal image near an edge).
FIG. 1(b) is a graph schematically showing the brightness distribution of the image.
Figure 2:
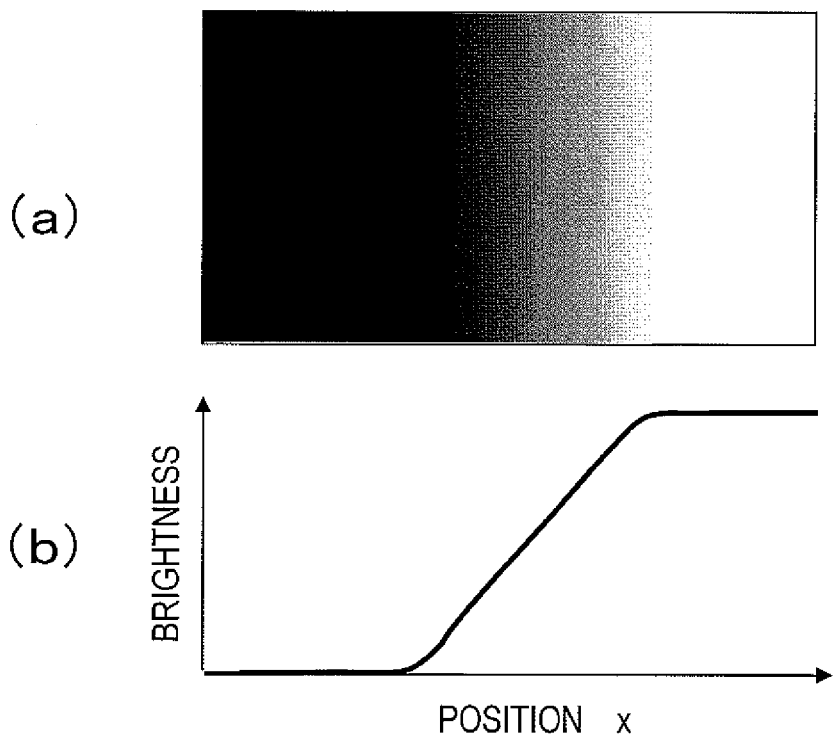
FIG. 2(a) is a plan view showing a degraded image (blurred image) obtained by photographing the image of FIG. 1(a) using a camera.
FIG. 2(b) is a graph schematically showing the brightness distribution of the image.

Prior to the description of embodiments of the present invention, the basic principle of the present invention is described.

FIG. 4 is a diagram schematically showing a structure of an image in this specification. In this specification, the brightness distribution of an image 130 formed on an imaging area is expressed by i(x,y). The coordinates (x,y) are two-dimensional coordinates which are indicative of the position of a pixel (photosensitive cell) on the imaging area. In the case of an image formed by, for example, M×N pixels 135 which are arranged in rows and columns, assuming that x and y are integers which satisfy the relationships of $0 \geq x \geq M-1$ and $0 \leq y \leq N-1$, respectively, the position of each one of the pixels that form the image can be specified by the coordinates (x,y). Here, it is assumed that the origin of the coordinate system, (0,0), is at the left upper corner of the image. The x axis extends in a vertical direction. The y axis extends in a horizontal direction. Note that the arrangement of the coordinates is not limited to this example but is arbitrary. In this specification, the brightness at a position indicated by coordinates (x,y) on an image is sometimes referred to as "pixel value".

Where the brightness distribution of an unblurred image (ideal image or original image) is s(x,y) and the PSF (Point Spread Function) which defines the blur is f(x,y), Formula 1 shown below holds when the effects of noise are neglected:

[Expression 1]

$$i(x,y) = s(x,y) * f(x,y) \quad \text{(Formula 1)}$$

where symbol "*" means convolution. In general, the right side of Formula 1 is expressed by Formula 2 shown below.

[Expression 2]

$$s(x,y) * f(x,y) = \int_{-\infty}^{\infty} \int_{-\infty}^{\infty} s(j,k) f(x-j, y-k) \, dj \, dk \quad \text{(Formula 2)}$$

When the image is formed by M×N pixels, Formula 2 shown above is expressed by Formula 3 shown below.

[Expression 3]

$$s(x,y) * f(x,y) = \frac{1}{M \times N} \sum_{j=0}^{M-1} \sum_{k=0}^{N-1} s(j,k) f(x-j, y-k) \quad \text{(Formula 3)}$$

If the function f(x,y) that is the point spread function PSF of blur is known, the unblurred image s(x,y) can be restored by deconvolution of an image i(x,y) which is photographed by a camera. If f(x,y) is unknown, it is necessary to estimate f(x,y) from the image before obtaining s(x,y).

In general, the Fourier transform of the convolution of two functions is expressed by the product of the Fourier transforms of the respective functions. Therefore, where the Fourier transforms of i(x,y), s(x,y) and f(x,y) are expressed by I(u,v), S(u,v) and F(u,v), respectively, Formula 4 shown below is derived from Formula 1. Note that (u,v) represents the coordinates in a frequency space, which respectively correspond to the spatial frequencies of the x direction and the y direction in a real image.

[Expression 4]

$$I(u,v) = S(u,v) \cdot F(u,v) \quad \text{(Formula 4)}$$

where symbol "·" means "multiplication" of the functions in the frequency space.

Formula 4 can be deformed to obtain Formula 5 shown below.

[Expression 5]

$$S(u,v) = \frac{I(u,v)}{F(u,v)} \quad \text{(Formula 5)}$$

This Formula 5 means that a function obtained by dividing I(u,v), which is the Fourier transform of the image i(x,y) photographed by a camera, by F(u,v), which is the Fourier transform of the point spread function PSF f(x,y), is equivalent to the Fourier transform S(u,v) of the ideal image s(x,y). In short, if I(u,v) and F(u,v) are determined, S(u,v) will also be determined. Since I(u,v) is the Fourier transform of an image photographed by a camera (degraded image), it is possible to restore an image based on the degraded image (to make the degraded image closer to its true image) by means of signal processing so long as the Fourier transform F(u,v) of f(x,y) that represents the point spread function PSF of camera shake is determined.

f(x,y) that represents the point spread function PSF of camera shake depends on the trajectory of the camera shake during photographing (exposure). In other words, the trajectory of camera shake varies among shots of photography with a camera, so that f(x,y) also varies among shots of photography with a camera. Estimation of f(x,y) can be realized not only by estimation from one or more images photographed by a camera but also by using a sensor to detect a movement of a camera (a trajectory of camera shake) during photographing (exposure). However, f(x,y) is merely obtained by estimation or measurement and therefore includes some errors. Thus, it is difficult to perfectly restore the ideal image s(x,y).

Non-patent Document 2 discloses that the trajectory of camera shake within a short exposure time is assumed as "a uniform linear motion", and the Fourier transform of its point spread function PSF is approximated by a sinc function. Assuming that the width of camera shake is W and the direction of camera shake is the x-axis direction, F(u,v), which is the denominator of Formula 5, is expressed by Formula 6 shown below:

[Expression 6]

$$F(u,v) = \frac{\sin(W\pi u)}{W\pi u} \quad \text{(Formula 6)}$$

The right side of Formula 6 is a sinc function. The amplitude of the sinc function periodically reaches zero (0). This period is the inverse of the camera shake width W, i.e., 1/W. If the direction of camera shake forms angle with the x axis, F(u,v) is a rotation of the function of Formula 6 by angle θ. Since an actual camera shake exhibits a complicated trajectory, the assumption of "a uniform linear motion" does not sufficiently hold true in some cases.

F(u,v) that is the denominator of Formula 5 periodically reaches zero, and this is thought to be a major cause of ringing artifacts in a flat portion of an image. Patent Documents 3 and 4 and Non-patent Documents 6 and 7 disclose that, in photographing, the number of points at which F(u,v) is zero is reduced by opening and closing the shutter according to a coded pattern during the exposure time. During the exposure time, the shutter is switched between the open state and the closed state. These techniques cause a loss because light is not utilized while the shutter is closed, so that the amount of light is insufficient, degrading the image capturing sensitivity.

According to the present invention, during a portion of the exposure time in which one of the solid-state image sensors (hereinafter, "image sensors") does not receive light, the other solid-state image capture device receives light, whereby the above problem is solved. A plurality of images obtained by a plurality of image sensors are subjected to a restoration process and a synthesizing process, whereby an excellent image is obtained. Note that, in this specification, the "exposure time" refers to a period of time extending from the start to the end of an intake of light into an image capture device for a single photographing operation.

An image capture device of the present invention includes a plurality of image sensors and a light entrance section. During the exposure time, the light entrance section allows received light (incoming light) to sequentially impinge on at least two of the plurality of image sensors according to a time-coded pattern (hereinafter, sometimes referred to as "coded pattern"). After the end of the intake of light, each of the image sensors outputs an image signal according to the light it received during the exposure time.

Figure 5A:
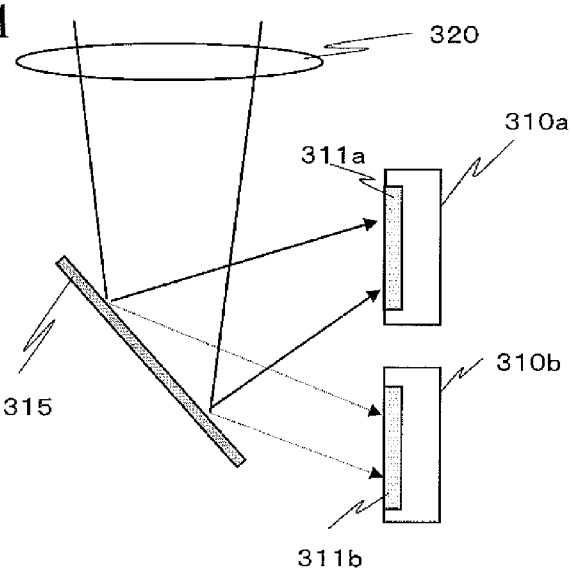
FIG. 5A schematically shows how an optical element allows incoming light to impinge on the first image sensor.
Figure 5B:
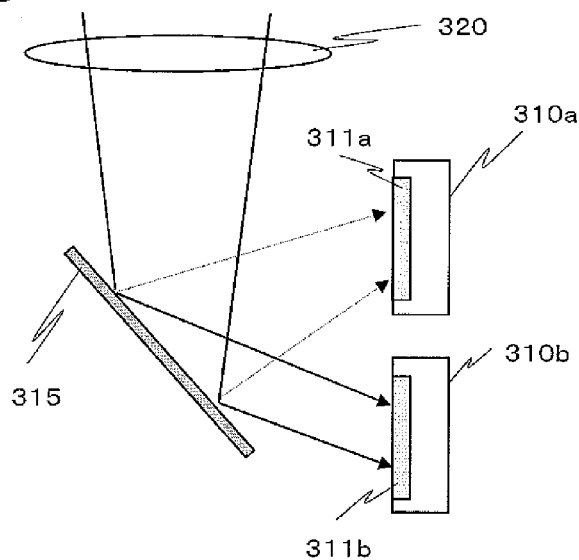
FIG. 5B schematically shows how the optical element allows incoming light to impinge on the second image sensor.

FIGS. 5A and 5B schematically show an example of a general configuration of an image capture section of an image capture device of the present invention. The shown image capture device includes solid-state image sensors 310a, 310b and an optical element 315 that allows light which has passed through a photography lens 320 (incoming light) to sequentially impinge on the image sensor 310a and the image sensor 310b. In this example, the optical element 315 functions as the light entrance section. FIG. 5A schematically shows light impinging on an imaging area 311a of the image sensor 310a. FIG. 5B schematically shows light impinging on an imaging area 311b of the image sensor 310b. For the sake of simplicity, FIGS. 5A and 5B show an example where the two image sensors 310a, 310b receive light. The device may be configured such that three or more image sensors sequentially receive light.

In the illustrated example, during the exposure time, the state shown in FIG. 5A and the state shown in FIG. 5B are alternately repeated according to a time-coded pattern, whereby one of the image sensors does not receive light while the other image sensor receives light. Therefore, the incoming light can be efficiently utilized. Two images obtained by the two image sensors during the exposure time are separately subjected to a restoration process in an unshown image processing section and are synthesized into a single image.

Figure 6A:
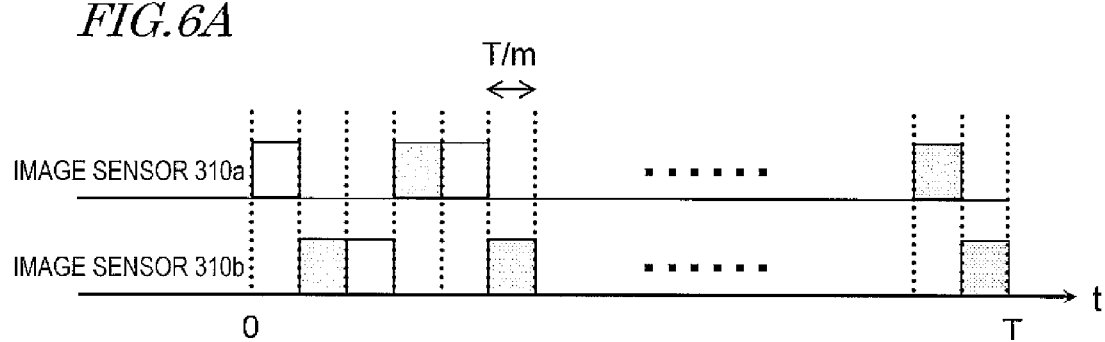
FIG. 6A shows an example of a time-coded pattern in the case where two image sensors can receive light.

In this specification, the "time-coded pattern" refers to a code that defines the pattern of switching of the image sensors on which light impinges during the exposure time with the passage of time. FIG. 6A shows an example of the time-coded pattern of the present invention. In this example, it is supposed that the exposure is started at time 0 and ended at time T, and the exposure time T is divided into m time blocks (m is an integer not less than 2). FIG. 6A shows which image sensor receives light from the optical element 315 in each one of the time blocks. As shown, the image sensors 310a, 310b alternately receive the light coming from the optical element 315. In this case, the minimum unit of time in which one image sensor receives the light is T/m. In this case, the time-coded pattern is defined by a code sequence, such as [011001 . . . 01], for example.

The above-described time-coded pattern is merely exemplary. The time-coded pattern may be in any form so long as it can define the pattern of switching of the image sensors which receive light during the exposure time with the passage of time. Note that the time-coded pattern is also defined based on the same concept when there are three or more image sensors which receive light from the optical element 315 during the exposure time. For example, when there are three image sensors which receive light from the optical element 315, the time-coded pattern shown in FIG. 6B may be used. In this case, in each time block, any of the three image sensors A, B, and C receives light from the optical element 315.

An image which is obtained by each of the image sensors when it receives light according to the above-described time-coded pattern during the exposure time has a smaller number of points at which F(u,v) that is the denominator of Formula 5 reaches zero as compared with an image which is obtained according to a conventional method. As a result, occurrence of noise, such as ringing, in a restored image can be prevented. Further, even when light does not impinge on one of the image sensors during the exposure time, light impinges on another image sensor. Therefore, the light utilization efficiency can be improved as compared with the prior art techniques. As a result, an image can be obtained which has less noise caused by image processing and which has improved brightness.

An image capture device of the present invention may further include a camera shake detection section. The camera shake detection section detect camera shake which occurs in photographing and generates camera shake information that represents the trajectory of the camera shake. Here, "trajectory of camera shake" refers to a trajectory which is drawn by a dot image on the imaging area due to a motion of the image capture device during the exposure time. FIG. 7 shows an example of the trajectory of camera shake. Suppose that, in the absence of camera shake, a dot image resides at one pixel on the imaging area. When camera shake occurs, this dot image extends across a plurality of pixels and draws a trajectory according to the motion of the image capture device during the exposure time. In general, the brightness values of the pixels on this trajectory are different from one another. This is because the motion of the image capture device does not occur at a constant velocity during the camera shake. The "camera shake information" may be information about with what weight a dot image extends across a plurality of pixels due to camera shake.

A plurality of images obtained by a plurality of image sensors in a single photographing operation, the information which represents the time-coded pattern, and the camera shake information undergo processes in an unshown image processing section. Firstly, the image processing section determines PSFs corresponding to the respective images using the coded pattern and the camera shake information. Thereafter, the image processing section performs a restoration process on the respective images according to a known restoration method to generate a plurality of restored images in which blur due to camera shake is reduced. These restored images are synthesized so that one synthesized restored image is obtained. The thus-obtained synthesized restored image is an excellent image which has less noise, such as ringing.

Hereinafter, the first embodiment of the present invention is described with reference to the drawings. In the descriptions provided below, the same elements are denoted by the same reference marks.

Embodiment 1

Figure 8:
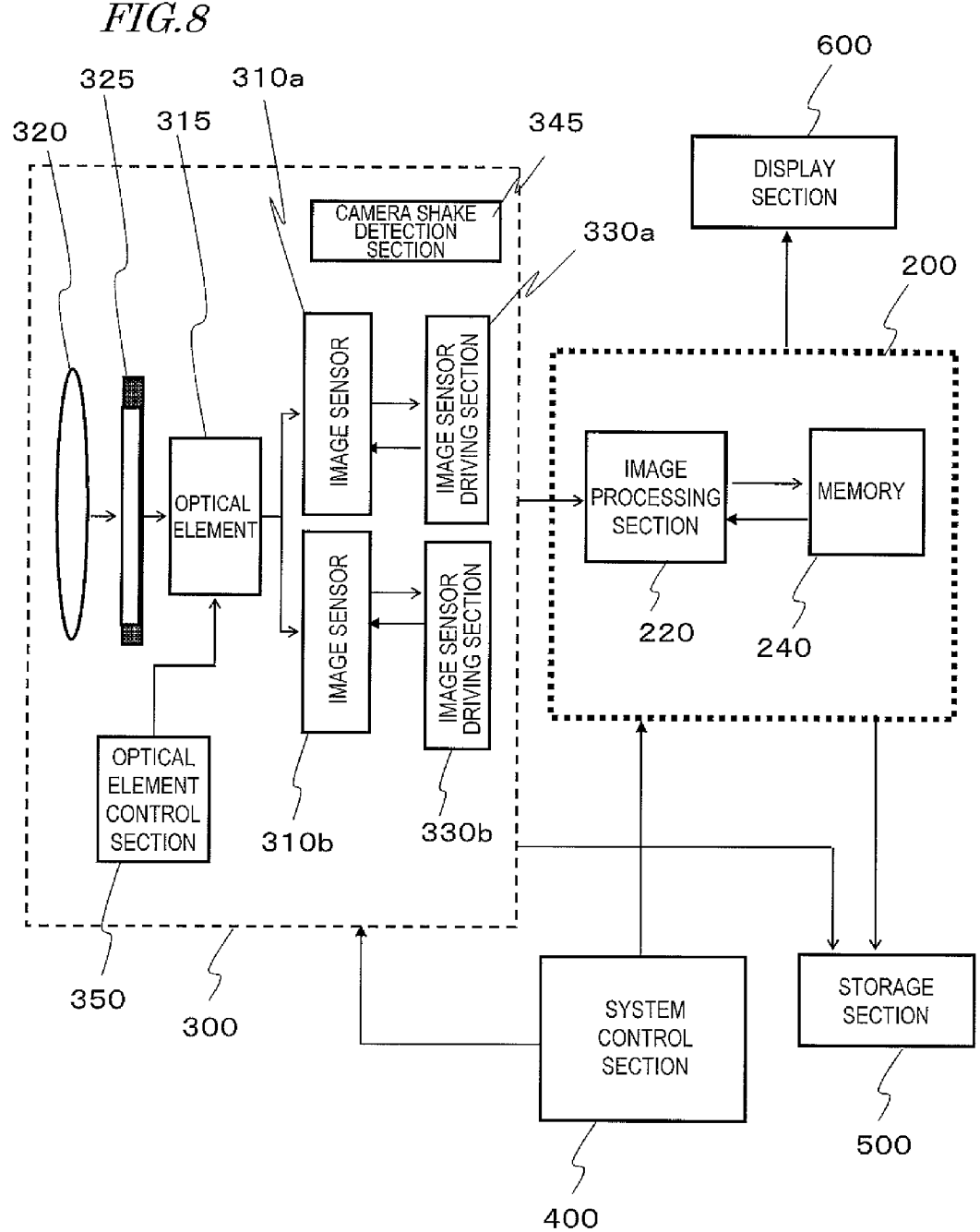
FIG. 8 shows a general configuration of an image capture device of the first embodiment of the present invention.

FIG. 8 is a block diagram showing a general configuration of the image capture device of the present embodiment. The image capture device of the present embodiment is a digital electronic camera, but the present invention is not limited to this example. The image capture device includes, as illustrated in FIG. 8, an image capture section 300, an image processing section 200 for performing various signal processing and restoration and synthesis of images, a display section 600 for displaying an image obtained by image capturing, a storage section 500 for storing data of the image, and a system control section 400 for controlling respective sections. A major difference of the image capture device of the present embodiment from known image capture devices resides in the image capture section 300 and the image processing device 200.

The image capture section 300 of the present embodiment includes two image capture elements (image sensors) 310a, 310b that have a plurality of photosensitive cells (photodiodes) arranged over an imaging area, a shutter 325 which has the function of a lens stop, and a photography lens 320 for forming images on the imaging areas of the image sensors 310a, 310b. A typical example of the image sensors 310 is a CCD or a CMOS sensor. The photography lens 320 has a known configuration and may be, in actuality, a lens unit which is formed by a plurality of lenses. The shutter 325 and the photography lens 320 are driven by an unshown mechanism to perform operations which are necessary for optical zooming, Auto Exposure (AE) and Auto Focus (AF).

The image capture section 300 further includes image sensor driving sections 330a, 330b for respectively driving the image sensors 310a, 310b. The image sensor driving sections 330a, 330b may be realized by, for example, a semiconductor integrated circuit, such as a CCD driver. The image sensor driving sections 330a, 330b respectively drive the image sensors 310a, 310b to read out analog signals (photoelectrically converted signals) respectively from the image sensors 310a, 310b and convert the analog signals to digital signals.

The image capture section 300 may further includes a camera shake detection section 345 for detecting camera shake during photographing. The camera shake detection section 345 may be, for example, a known gyro scope or acceleration sensor. The camera shake detection section 345 detects the motion of the image capture device during the exposure time and generates information that represents the trajectory of the camera shake (camera shake information). The generated camera shake information is input to a signal processing section 200 and used in the process of determining PSFs for restoration of respective images.

The image capture section 300 may further include an optical element 315 and an optical element control section 350. The optical element 315 is configured to allow light which has passed through the shutter 325 to alternately impinge on the two image sensors 310a, 310b according to a time-coded pattern. The optical element control section 350 controls the operation of the optical element 315. The optical element 315 of the present embodiment may be, for example, a micromirror device which has a plurality of movable micromirrors placed on a semiconductor integrated circuit. The optical element 315 is capable of switching the orientation of the micromirrors among at least two directions according to an input signal. The optical element control section 350 switches the signal input to the optical element 315 according to a predetermined time-coded pattern, thereby controlling the operation of the optical element 315. The optical element control section 350 may be realized by, for example, a semiconductor integrated circuit which is configured to exert the above control, or software which defines the above control. An entry interface may be further provided such that a user can set a desired time-coded pattern.

The configuration of the optical element 315 and the image sensors 310a, 310b is described in more detail with reference to FIG. 5A and FIG. 5B again. The image sensors 310a, 310b have imaging areas 311a, 311b, respectively, and include a plurality of photosensitive cells arrayed over the imaging areas 311a, 311b. The arrangement of the photosensitive cells may be any known arrangement. The planar shape of each photosensitive cell may be any shape. Note that, to generate a color image signal, typically, primary color filters or complementary color filters are provided so as to correspond to respective ones of the photosensitive cells. For efficient condensation of light on the respective photosensitive cells, microlenses may be provided so as to correspond to respective ones of the photosensitive cells. The positions of the optical element 315 and the image sensors 310a, 310b are suitably adjusted such that the size and orientation of images formed on the imaging areas of each image sensors are identical.

The optical element 315 allows incoming light to alternately impinge on the image sensors 310a, 310b according to the time-coded pattern as described above. Where the exposure time T is divided into m time blocks (m is an integer not less than 2) as shown in FIG. 6A, for example, the time-coded pattern defines on which image sensor the light impinges in each of the time blocks. The time-coded pattern used may be a time-coded pattern disclosed in Patent Documents 3 and 4 and Non-patent Documents 6 and 7 or may be a random pattern. Alternatively, a regular pattern may be used such that the image sensors receive light substantially equal number of times. For example, where m=50 and T/m=100 μs, the optical element 315 may allow light to alternately impinge on the image sensors 310a, 310b with the intervals of time block length of 100 μs. The time-coded pattern of the present embodiment may be defined by a binary code sequence as described above. The time-coded pattern may be such that the time block length is regulated according to, for example, the exposure time or the amount of camera shake.

While the optical element 315 switches provision of light from one of the image sensors (first image sensor) to the other image sensor (second image sensor), an image formed on the imaging areas of the respective image sensors would be moved. Specifically, an image which has been fixed on the imaging area of the first image sensor in one time block makes a move during the switch till the image is fixed on the imaging area of the second image sensor. Due to this move of the image, light would not impinge on the respective image sensors as intended, so that there is a probability of an error. To reduce such an error, the shutter 325 may perform an opening/closing operation in conjunction with the time-coded pattern. Specifically, the control may be exerted such that the shutter 325 is closed at the timing when the optical element 315 starts the operation of switching the direction of incoming light from the first image sensor to the second image sensor, and the shutter 325 is opened at the timing when the image is fixed on the second image sensor. Since in this case the light is interrupted during the switch, unintended light can be prevented from impinging on the respective image sensors due to the above-described move of the image. Alternatively, the same operation may be realized by a second shutter provided between the optical element 315 and the respective image sensors, rather than engaging the shutter 325 to perform the above-described opening/closing operation.

Figure 9A:
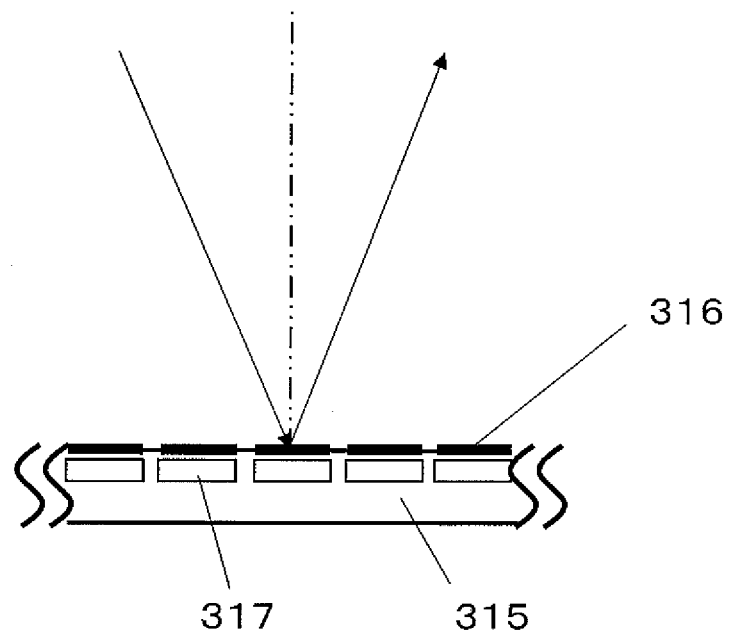
FIG. 9A shows an example of an optical element 315 in the first embodiment of the present invention.
Figure 9B:
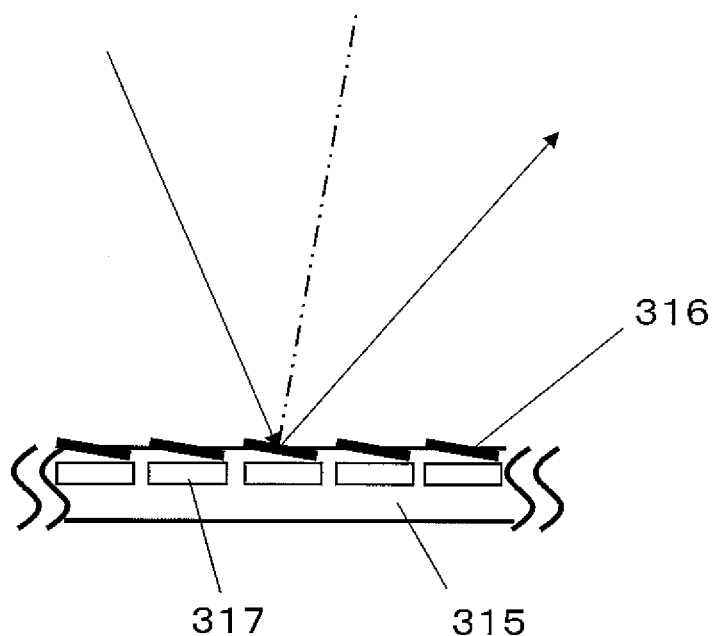
FIG. 9B shows an example of an optical element 315 in the first embodiment of the present invention, where the reflection surfaces are inclined.

FIGS. 9A and 9B schematically show an example of the configuration of the optical element 315. The shown optical element 315 includes a plurality of micromirrors 316 which are arrayed in a two-dimensional arrangement and a mirror driving section 317 for driving the respective micromirrors. FIG. 9A and FIG. 9B show part of a cross section taken along a plane perpendicular to the installation plane of the micromirrors 316. The mirror driving section 317 can change the angle of the reflection surfaces of the micromirrors 316 according to a signal input from the optical element control section 350. The mirror driving section 317 may be realized by microactuators which are fabricated using, for example, a MEMS technique. The microactuators drive the reflection surfaces of the micromirrors with high responsiveness.

When the signal input from the optical element control section 350 to the optical element 315 is in the first state (e.g., in the absence of an applied voltage), the orientation of the micromirrors 316 is parallel to the installation plane of the micromirrors 316 as shown in FIG. 9A. On the other hand, when the signal input from the optical element control section 350 to the optical element 315 is in the second state (e.g., in the presence of an applied voltage), the orientation of the micromirrors 316 is inclined by a certain angle relative to the installation plane of the micromirrors 316 as shown in FIG. 9B.

The micromirrors 316 perform the above-described operation so that light arriving at the optical element 315 is reflected in different directions according to the state of the input signal. As a result, the light is allowed to alternately impinge on the two different image sensors 310a, 310b. Note that the above-described micromirrors 316 are merely exemplary. The micromirrors 316 may perform any operation so long as they are configured to control the light so as to impinge on the respective image sensors.

Next, a signal processing section 200 is described with reference to FIG. 8 again. The signal processing section 200 of the present embodiment includes an image processing section (image processor) 220 and a memory 240. The image processing device 200 is coupled to a display section 600, such as a liquid crystal display panel, and a storage medium 500, such as a memory card.

The image processing section 220 performs various signal processing, such as color tone correction, change of resolution, and data compression, as well as the restoration process on a degraded image and the synthesizing process of restored images of the present invention. The image processing section 220 restores each of the two images obtained by the image capture section 300 in every photographing operation and then synthesizes the two restored images to output a synthesized restored image. The image processing section 220 is preferably realized by a combination of hardware, such as a known digital signal processor (DSP), and software for execution of image processing. The memory 240 may be formed by a DRAM or the like. The memory 240 stores image data obtained from the image capture section 300 and, meanwhile, temporarily stores image data which have undergone various image processing or image data which have been compressed in the image processing section 220. The image data are converted to analog signals and thereafter displayed in the display section 600. Alternatively, the image data which remain in the form of digital signals are stored in the storage section 500. The image data may be transmitted to another device (not shown) via an unshown wireless or wired communication device.

The above components are controlled by the system control circuit 400 that includes an unshown central processing unit (CPU) and a flash memory. Note that the image capture device of the present embodiment may include other known components, such as an optical viewfinder, a power source (battery), and a flashlight. However, descriptions of such components are not particularly necessary for understanding of the present invention and are therefore omitted.

Hereinafter, the configuration of the image processing section 220 of the present embodiment is described in more detail with reference to FIG. 10.

Figure 10:
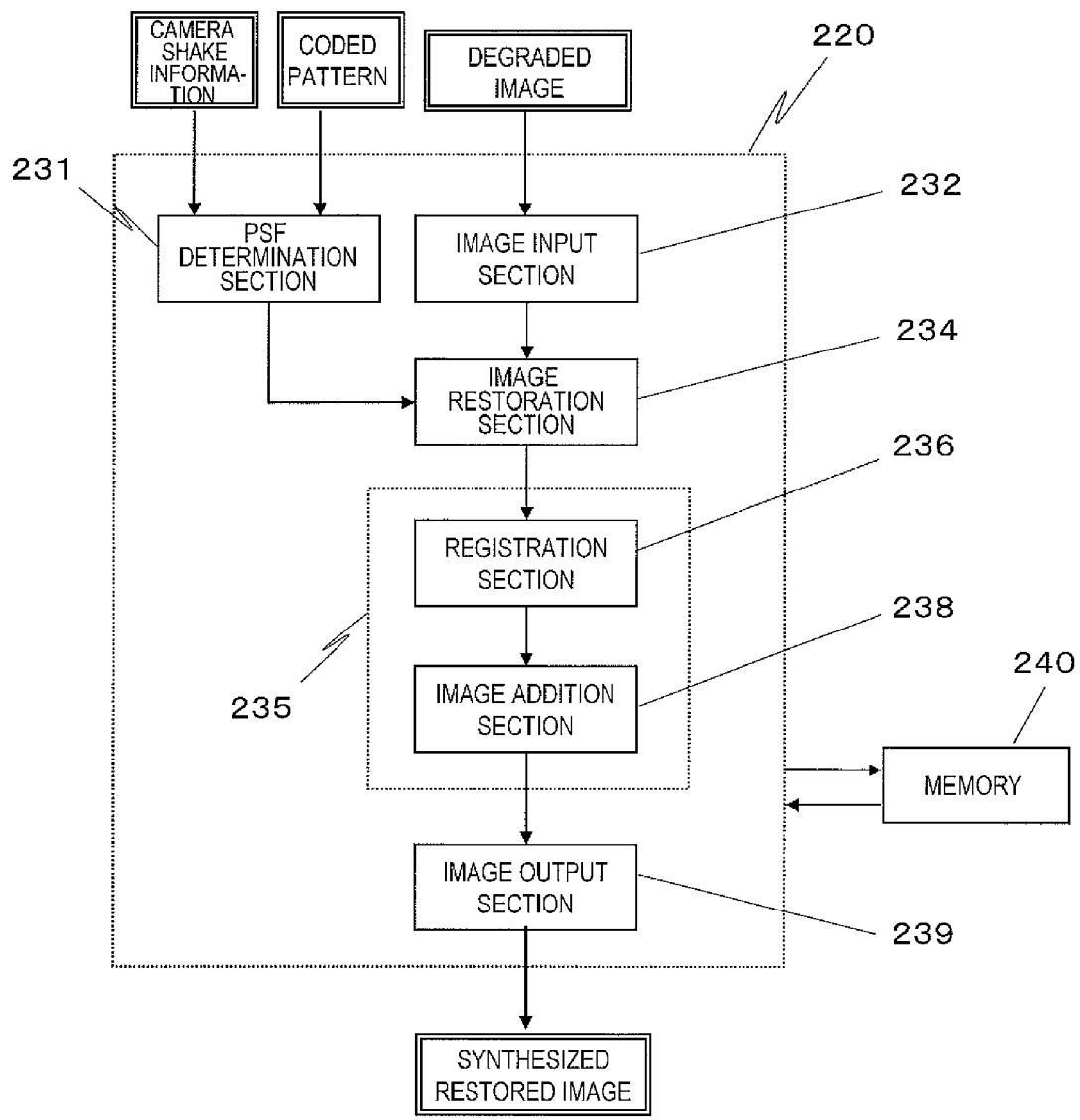
FIG. 10 is a block diagram showing a configuration of an image processing section in the first embodiment of the present invention.

FIG. 10 is a block diagram showing the configuration of the image processing section 220 of the present embodiment. The image processing section 220 includes an image input section 232 and a PSF determination section 231. The image input section 232 obtains images which include blur due to camera shake (degraded images) from the image capture section 300. The PSF determination section 231 obtains camera shake information and information that represents a time-coded pattern from the image capture section 300 and determines PSFs for performing a restoration process on the respective degraded images. The image processing section 220 further includes an image restoration section 234 for performing a restoration process on the obtained degraded images, an image synthesizing section 235 for synthesizing a plurality of restored images, and an image output section 239 for outputting a synthesized image (synthesized restored image). Here, the image synthesizing section 235 includes a registration section 236 and an image addition section 238.

The image input section 232 obtains, from the image capture section 300, two degraded images obtained by the image sensors 310a, 310b in every single photographing operation. The two obtained degraded images are input to the image restoration section 234.

The PSF determination section 231 obtains, from the image capture section 300, information that represents the time-coded pattern and camera shake information generated by the camera shake detection section 345. Thereafter, the PSF determination section determines two PSFs which respectively define blurs of the two degraded images using the obtained information that represents the time-coded pattern and the obtained camera shake information. Each of the PSFs is determined by extracting a portion of the camera shake information corresponding to the time when an image sensor which obtained the image received light. The two determined PSFs are input to the image restoration section 234.

The image restoration section 234 generates two restored images using the two input degraded images and the two PSFs. The restoration process performed by the image restoration section 234 is not limited to any particular algorithm. It may be any known image restoration process. For example, the known Richardson-Lucy (LR) method or Wiener filtering method may be used. Alternatively, the sparse coding method disclosed in Non-patent Document 1 may be used. The two generated restored images are input to the registration section 236.

The registration section 236 adjusts the positions of the two restored images generated by the image restoration section 234. Specifically, a normalized correlation of the two images is determined, and the positions of the highest correlation value are determined. For example, the normalized correlation of the two images is sequentially calculated while one of the images is fixed and the other being shifted in either of the X and Y directions on a pixel-by-pixel basis within a range which is generally as large as the size of the PSF. Here, the size of the PSF means the number of pixels included in a rectangular region formed by pixels arrayed in the X direction and pixels arrayed in the Y direction in which the PSF has a finite value. A position at which the calculated normalized correlation value reaches the maximum is assigned as an adjusted position. The two restored images whose positions have been adjusted are input to the image addition section 238.

The image addition section 238 adds together the brightness values of two corresponding pixels of the two restored images, thereby generating a synthesized restored image. Note that the image addition section 238 may add together the brightness values of the two corresponding pixels of the two restored images with one brightness value being weighted differently from the other, rather than simply adding together the brightness values. For example, the images may be superimposed one on the other in the proportion of 6:4.

The image output section 239 outputs the synthesized restored image obtained as described above. The synthesized restored image may be, for example, recorded in a storage section 500 and displayed in a display section 600.

The configuration shown in FIG. 10 is an example of the function block of the image processing section 220. The image processing section 220 may be divided into other function blocks. The image processing section may be preferably realized by, for example, incorporating image processing software into known hardware.

Hereinafter, the procedure of photographing by a user with the use of the image capture device of the present embodiment is described.

When a user presses a shutter release button, the shutter 325 is opened so that the "exposure" is started. At this timing, the optical element control section 350 inputs a control signal to the optical element 315 according to the previously-described time-coded pattern. The optical element 315 changes the orientation of the reflection surfaces of the micromirrors 316 according to the input control signal. As a result, light alternately impinges on the image sensors 310a, 310b. When the image capture device is unstably moved by the user during the exposure time, an image moves over the imaging areas of the image sensors 310a, 310b, so that obtained images include blur due to camera shake. Here, the camera shake detection section 345 detects the trajectory of the camera shake and outputs information that represents the detected trajectory of the camera shake. After the end of the "exposure", the image capture section 300 outputs to the signal processing section 200 the two images obtained by the image sensors 310a, 310b, the camera shake information detected by the camera shake detection section 345, and the information that represents the time-coded pattern.

The signal processing section 200 receives the two input images, the camera shake information, and the information that represents the time-coded pattern. Either of the thus-obtained two images is a degraded image which is expressed by i(x, y) in the left side of Formula 7. In the signal processing section 200, the image processing section 220 performs the process of restoring s(x,y) from i(x, y) for the two images. The two restored images obtained by the restoration process are synthesized into a single image. The resultant synthesized image is displayed in the display section 600 and, when necessary, recorded in the storage section 500.

Hereinafter, an example of the restoration process and the image synthesizing process which can be performed in the present embodiment is described with reference to FIG. 11.

Figure 11:
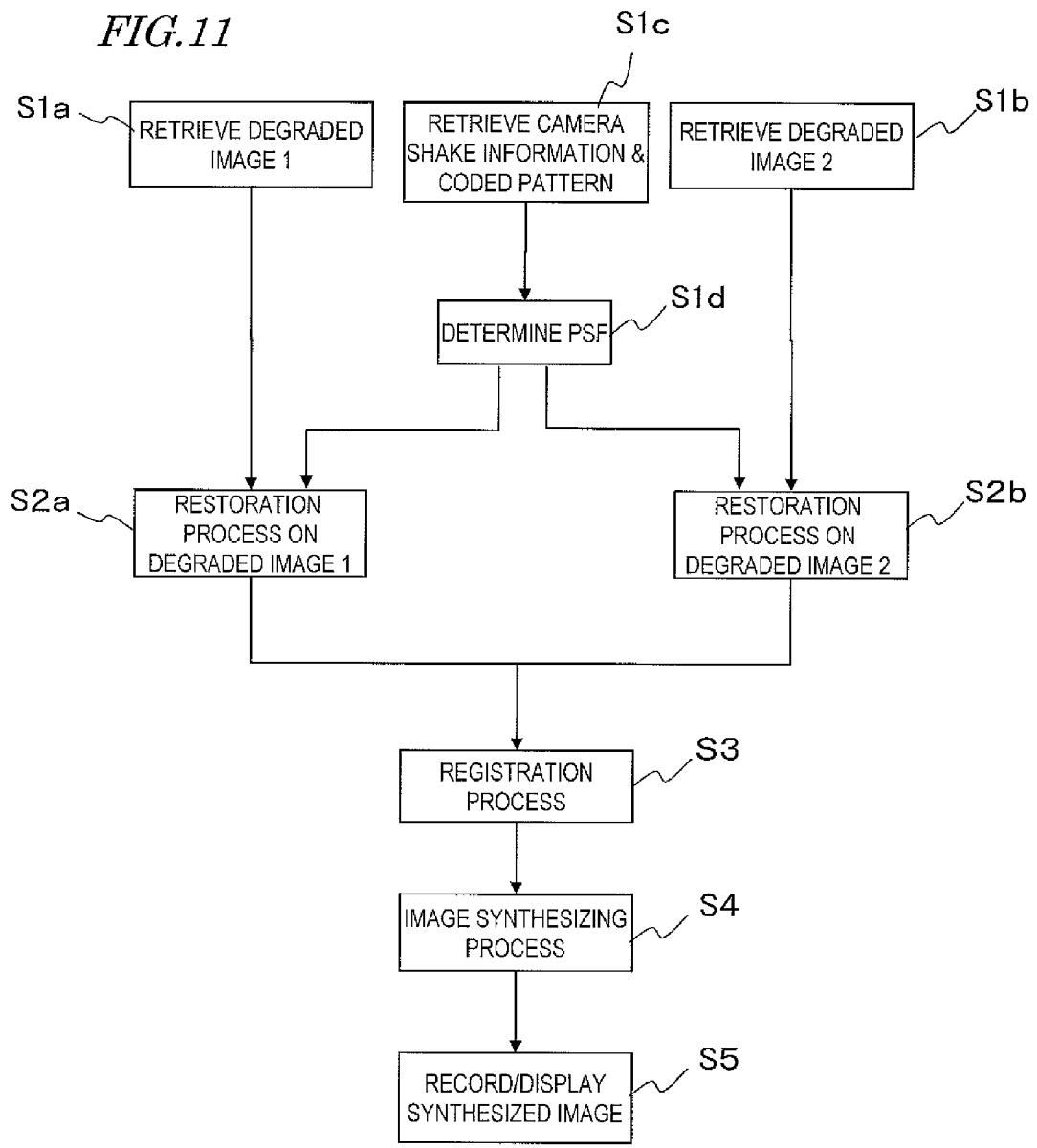
FIG. 11 is a flowchart which illustrates the process flow in the image processing section in the first embodiment of the present invention.

FIG. 11 is a flowchart which illustrates an example of the restoration process. Firstly, the image input section 232 obtains two images obtained by the image sensors 310a, 310b, i.e., degraded image 1 and degraded image 2 (S1a, S1b). The two obtained images are input to the image restoration section 234. Meanwhile, the PSF determination section 231 obtains the information that represents the time-coded pattern and the camera shake information detected in the camera shake detection section (S1c). The PSF determination section 231 determines two PSFs which respectively define the blur of degraded image 1 and the blur of degraded image 2 using the time-coded pattern and the camera shake information (S1d). The two determined PSFs are input to the image restoration section 234.

Then, the image restoration section 234 uses the two determined PSFs to restore images respectively corresponding the PSFs, thereby generating two restored images (S2a, S2b). The relative positions of the two generated restored images are adjusted by the registration section 236 (S4). Thereafter, the image addition section 238 adds together the brightness values of corresponding pixels of the two restored images, whereby a synthesized image is generated (S4). The synthesized image is displayed in the display section 600 and recorded in the storage section 500 (S5).

Through the above-described process, a single synthesized image is obtained from two degraded images. The thus-obtained image is an excellent image which has less noise, such as ringing, and which has high light utilization efficiency. Further, according to the present embodiment, the effects of noise which is attributed to a dark current, or the like, can be reduced as compared with an image obtained by simply amplifying an image obtained by the prior art Coded Exposure Photography. In the case of the prior art Coded Exposure Photography, the light utilization efficiency is low, so that noise in a restored image which is attributed to a dark current of the image sensor is conspicuous. Dark current noise randomly occurs by the units of a pixel, and therefore, when a single image is amplified, the noise is also amplified. In the present embodiment, two images obtained from the two image sensors are superimposed one on the other, so that portions of the image which include noise are dispersed. Therefore, an excellent image is obtained in which the noise is inconspicuous.

In the present embodiment, the image capture section 300 includes two image sensors 310a, 310b. However, in the present invention, the image capture section 300 may include three or more image sensors. In that case, the effects of the present invention are achieved so long as the optical element 315 is configured to allow light that has passed through the shutter 325 to sequentially impinge on the respective image sensors according to a time-coded pattern. In an example where the number of image sensors which can receive light is three, the time-coded pattern such as shown in FIG. 6B may be used. Also in this case, images obtained by the respective image sensors undergo the above-described image processes for restoration and synthesis, whereby a single synthesized restored image is obtained.

The optical element 315 may not necessarily be a micromirror device. Any device may be used so long as it allows light to selectively impinge on a plurality of image sensors according to a time-coded pattern. For example, the optical element 315 may have a single mirror section which is capable of changing the orientation of the reflection surface according to the time, instead of a plurality of micromirrors. Even in that case, the effects of the present invention can be obtained so long as the mirror section is configured such that a mirror control section can change the orientation of the reflection surface with high responsiveness. Alternatively, the image capture section 300 may be configured such that reflected light and transmitted light impinge on different image sensors with the use of an optical element which is capable of switching transmission and reflection of incoming light according to the time.

The optical element control section 350 may not necessarily be a function section which is independent of the optical element 315. The optical element control section 350 may be included in the optical element 315. The system control section 400 may have the function of the optical element control section 350. The image sensor driving sections 330a, 330b may not necessarily be separate function sections respectively corresponding to the image sensors 310a, 310b but may be integrated together. Alternatively, the system control section 400 may have the functions of the image sensor driving sections 330a, 330b.

The image processing section 220 may not necessarily be provided in the image capture device. The image processing section 220 may be provided in an external device. For example, the image capture device may record the information that represents a coded pattern, the camera shake information, and the two obtained images in the storage section 500, without processing the obtained image data. The effects of the present invention can be achieved by instructing an external device to retrieve the recorded image data and perform a program which defines the above-described process which is to be performed by the image processing section 220.

In the descriptions provided above, the PSF determination section is provided in the image processing section 220. However, the PSF determination section 231 may be provided in the image capture section 300. In this case, the PSFs which define blur in respective images obtained by the respective image sensors are determined in the image capture section 300 and input to the signal processing section 200. The effects of the present invention are similarly achieved even in such a configuration.

In the descriptions provided above, the PSFs are determined based on the camera shake information detected by the camera shake detection section 345, such as a gyro scope or a acceleration sensor. However, the method of determining the PSFs in the present invention is not limited to this example. For example, the PSFs may be determined according to a known PSF estimation method using a PSF arbitrarily set by a user as the initial PSF. Alternatively, determination of PSFs and the image restoration process are repeated over a plurality of cycles according to, for example, the method disclosed in Non-patent Document 1, whereby restored images may be generated.

Hereinafter, the procedure of a restoration process performed on a plurality of degraded images based on the sparse coding method disclosed in Non-patent Document 1 is described. Firstly, the PSF determination section 231 sets the initial value of a PSF corresponding to each degraded image. Here, each PSF may be set manually or may be set based on the above-described camera shake information. When each PSF is manually set, the image capture device does not need to include the camera shake detection section 345. In each PSF, a portion corresponding to the time when an image sensor which obtained a corresponding degraded image did not receive light is set to zero (0). Then, the image restoration section 234 generates the first restored image from each PSF and a corresponding degraded image. The PSF determination section 231 estimates a PSF which is closer to the true PSF using the first restored image and the degraded image. Also in the estimated PSF, similarly, a portion corresponding to the time when an image sensor which obtained a corresponding degraded image did not receive light is set to zero based on the coded pattern. Subsequently, the image restoration process and the PSF estimation process are similarly repeated, whereby a plurality of restored images corresponding to the respective degraded images can be obtained. The plurality of thus-obtained restored images are synthesized by the image synthesizing section 235, whereby a synthesized restored image is generated.

INDUSTRIAL APPLICABILITY

According to the present invention, ringing which would occur in an image restoration process can be reduced, and the light utilization efficiency can be improved. Therefore, the present invention is applicable to, for example, electronic still cameras.

REFERENCE SIGNS LIST 130 image
135 pixel
140 imaging area
200 signal processing section
220 image processing section
231 PSF determination section
232 image input section
234 image restoration section
235 image synthesizing section
236 registration section
238 image addition section
239 image output section
240 memory
300 image capture section
310a, 310b solid-state image capture device
311a, 311b imaging area of solid-state image capture device
315 optical element
316 microlens
317 mirror driving section
320 photography lens
325 shutter with lens stop function
330a, 330b image sensor driving section
345 camera shake detection section
350 optical element control section
400 system control section
500 storage section
600 display section

The invention claimed is:

1. An image capture device, comprising:
   a plurality of image sensors, each of which obtains an image according to light received by the image sensor during an exposure time;
   a light entrance section which is configured to allow incoming light to sequentially impinge on at least two of the plurality of image sensors according to a time-coded pattern during the exposure time;
   a camera shake detection section for detecting camera shake which occurs during the exposure time to generate camera shake information that represents a trajectory of the camera shake; and
   an image processing section for processing the plurality of images obtained by the plurality of image sensors,
   wherein the image processing section includes
      a PSF determination section for determining, based on the camera shake information and the time-coded pattern, a plurality of point spread functions that define blurs which are caused by the camera shake in the plurality of images obtained by the plurality of image sensors during the exposure time,
      an image restoration section for generating restored images in which the blurs caused by the camera shake are reduced from respective ones of the plurality of images based on the point spread functions, and
      an image synthesizing section for generating a synthesized image from the plurality of restored images generated by the image restoration section.

2. The image capture device of claim 1, wherein the light entrance section includes
   a mirror section which is capable of switching an inclination of its reflection surface such that the reflection surface reflects the incoming light so as to sequentially impinge on at least two of the plurality of image sensors, and
   a mirror driving section for driving the reflection surface of the mirror section according to the time-coded pattern during the exposure time.

3. The image capture device of claim 2, wherein
   the mirror section includes a plurality of micromirrors which are arrayed in a two-dimensional arrangement, and
   the mirror driving section drives reflection surfaces of the plurality of micromirrors according to the time-coded pattern.

4. The image capture device of claim 1, wherein the light entrance section allows the incoming light to alternately impinge on two image sensors according to the time-coded pattern.

5. The image capture device of claim 1, wherein the image synthesizing section superimposes the plurality of restored images together to generate the synthesized image.

6. An image capture device, comprising:
   a plurality of image sensors, each of which obtains an image according to light received by the image sensor during an exposure time;

a light entrance section which is configured to allow incoming light to sequentially impinge on at least two of the plurality of image sensors according to a time-coded pattern during the exposure time; and an image processing section for processing the plurality of images obtained by the plurality of image sensors, wherein the image processing section includes a PSF determination section for determining, based on the time-coded pattern, a plurality of point spread functions that define blurs which are caused by camera shake in the plurality of images obtained by the plurality of image sensors during the exposure time, an image restoration section for generating restored images in which the blurs caused by the camera shake are reduced from respective ones of the plurality of images based on the point spread functions, and an image synthesizing section for generating a synthesized image from the plurality of restored images generated by the image restoration section.

7. An image capture device, comprising:

a plurality of image sensors, each of which obtains an image according to light received by the image sensor during an exposure time;

a light entrance section which is configured to allow incoming light to sequentially impinge on at least two of the plurality of image sensors according to a time-coded pattern during the exposure time;

a camera shake detection section for detecting camera shake which occurs during the exposure time to generate camera shake information that represents a trajectory of the camera shake;

a recording section for recording information that defines the time-coded pattern, the plurality of images obtained by the plurality of image sensors during the exposure time, and the camera shake information in a storage medium, and a PSF determination section for determining, based on the camera shake information and the time-coded pattern, a plurality of point spread functions that define blurs which are caused by camera shake in the plurality of images obtained by the plurality of image sensors during the exposure time, wherein the recording section records the plurality of point spread functions in the storage medium.

8. An image processing device, comprising:

an input section for retrieving the information that defines the time-coded pattern, the plurality of images, and the camera shake information recorded by the image capture device of claim 7;

a PSF determination section for determining, based on the information that defines the time-coded pattern and the camera shake information, a plurality of point spread functions that define blurs which are caused by camera shake in the plurality of images;

an image restoration section for generating restored images in which the blurs caused by the camera shake are reduced from respective ones of the plurality of images based on the point spread functions, and an image synthesizing section for generating a synthesized image from the plurality of restored images generated by the image restoration section.

9. A non-transitory storage medium that stores a program for processing a plurality of images which are obtained by an image capture device during an exposure time, the image capture device including a plurality of image sensors, each of which obtains an image according to light received by the image sensor during the exposure time;

a light entrance section which is configured to allow incoming light to sequentially impinge on at least two of the plurality of image sensors according to a time-coded pattern during the exposure time; and a camera shake detection section for detecting camera shake which occurs during the exposure time to generate camera shake information that represents a trajectory of the camera shake, the program comprising the steps of:

obtaining information that defines the time-coded pattern, the plurality of images, and the camera shake information;

determining, based on the information that represents the time-coded pattern and the camera shake information, a plurality of point spread functions that define blurs which are caused by camera shake in the plurality of images obtained by the plurality of image sensors during the exposure time;

generating restored images in which the blurs caused by the camera shake are reduced from respective ones of the plurality of images based on the point spread functions; and generating a synthesized image from the plurality of restored images generated by the image restoration section.

* * * * *